United States Patent
Horn et al.

(10) Patent No.: US 10,227,738 B2
(45) Date of Patent: *Mar. 12, 2019

(54) ROAD PAVER HAVING LAYER THICKNESS DETECTING DEVICE, AND METHOD FOR DETECTING THE THICKNESS OF AN APPLIED MATERIAL LAYER

(71) Applicant: MOBA Mobile Automation AG, Limburg (DE)

(72) Inventors: Alfons Horn, Limburg (DE); Dominik Horn, Limburg (DE); Thomas Hiltenkamp, Limburg (DE); Marcus Watermann, Limburg (DE)

(73) Assignee: MOBA MOBILE AUTOMATION AG, Limburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/964,143

(22) Filed: Apr. 27, 2018

(65) Prior Publication Data

US 2018/0245295 A1 Aug. 30, 2018

Related U.S. Application Data

(63) Continuation of application No. 15/264,640, filed on Sep. 14, 2016, now Pat. No. 9,988,773, which is a (Continued)

(30) Foreign Application Priority Data

Mar. 18, 2014 (EP) ..................................... 14160503

(51) Int. Cl.
*E01C 23/07* (2006.01)
*E01C 19/22* (2006.01)
(Continued)

(52) U.S. Cl.
CPC .............. *E01C 23/07* (2013.01); *E01C 19/22* (2013.01); *E01C 19/42* (2013.01); *E01C 19/48* (2013.01);
(Continued)

(58) Field of Classification Search
CPC .......... E01C 23/07; E01C 23/01; E01C 19/42; E01C 19/4873; E01C 19/22; E01C 19/48;
(Continued)

(56) References Cited

U.S. PATENT DOCUMENTS 5,258,961 A * 11/1993 Sehr ...................... E01C 19/006
367/96
6,352,386 B2 3/2002 Heims
(Continued)

FOREIGN PATENT DOCUMENTS

| CN | 1743552 A | 3/2006 |
| CN | 102828459 A | 12/2012 |
| JP | 4045004 B2 | 2/2008 |

OTHER PUBLICATIONS

Horn et al., "Road Paver Having Layer Thickness Detecting Device and Method", U.S. Appl. No. 15/264,640, filed Sep. 14, 2016.

*Primary Examiner* — Abigail A Risic
(74) *Attorney, Agent, or Firm* — Keating & Bennett, LLP

(57) ABSTRACT

A road paver includes a screed for applying a material layer to a foundation and a layer thickness detecting device for detecting the thickness of the applied material layer. The layer thickness detecting device includes a first sensor for detecting a first distance from the applied material layer and a second sensor for detecting a second distance from the foundation. The layer thickness detecting device is securely attached to the screed.

26 Claims, 8 Drawing Sheets

Related U.S. Application Data continuation of application No. PCT/EP2015/055555, filed on Mar. 17, 2015.

(51) Int. Cl.
| | |
|---|---|
| *E01C 19/42* | (2006.01) |
| *E01C 19/48* | (2006.01) |
| *E01C 21/00* | (2006.01) |
| *G01B 5/06* | (2006.01) |
| *G01B 21/08* | (2006.01) |
| *E01C 23/01* | (2006.01) |

(52) U.S. Cl.
CPC .............. *E01C 21/00* (2013.01); *E01C 23/01* (2013.01); *G01B 5/06* (2013.01); *G01B 21/08* (2013.01); *E01C 2301/00* (2013.01)

(58) Field of Classification Search
CPC .... E01C 19/405; E01C 19/4833; E01C 21/00; E01C 21/08; E01C 2301/20; E01C 2301/00; E01C 2301/14; E01C 2301/40; E01C 2301/30; E01C 2301/02; E01C 2301/10

See application file for complete search history.

(56) References Cited

U.S. PATENT DOCUMENTS

| | | | |
|---|---|---|---|
| 7,172,363 B2* | 2/2007 | Olson | E01C 19/006 404/118 |
| 9,534,349 B2* | 1/2017 | Horn | |
| 2006/0045620 A1* | 3/2006 | Olson | E01C 19/006 404/84.1 |
| 2010/0129152 A1* | 5/2010 | Taylor | E01C 23/07 404/75 |
| 2012/0263531 A1* | 10/2012 | Rutz | E01C 19/00 404/72 |
| 2012/0321384 A1* | 12/2012 | Hanfland | G01B 21/08 404/72 |
| 2012/0321385 A1* | 12/2012 | Hanfland | G01B 21/08 404/84.1 |
| 2014/0099165 A1* | 4/2014 | Smieja | E01C 19/48 404/72 |
| 2014/0133906 A1* | 5/2014 | Frelich | E01C 19/48 404/75 |
| 2015/0267361 A1* | 9/2015 | Horn | E01C 23/01 404/84.05 |
| 2015/0361627 A1* | 12/2015 | Frelich | E01C 19/4853 180/65.245 |

* cited by examiner

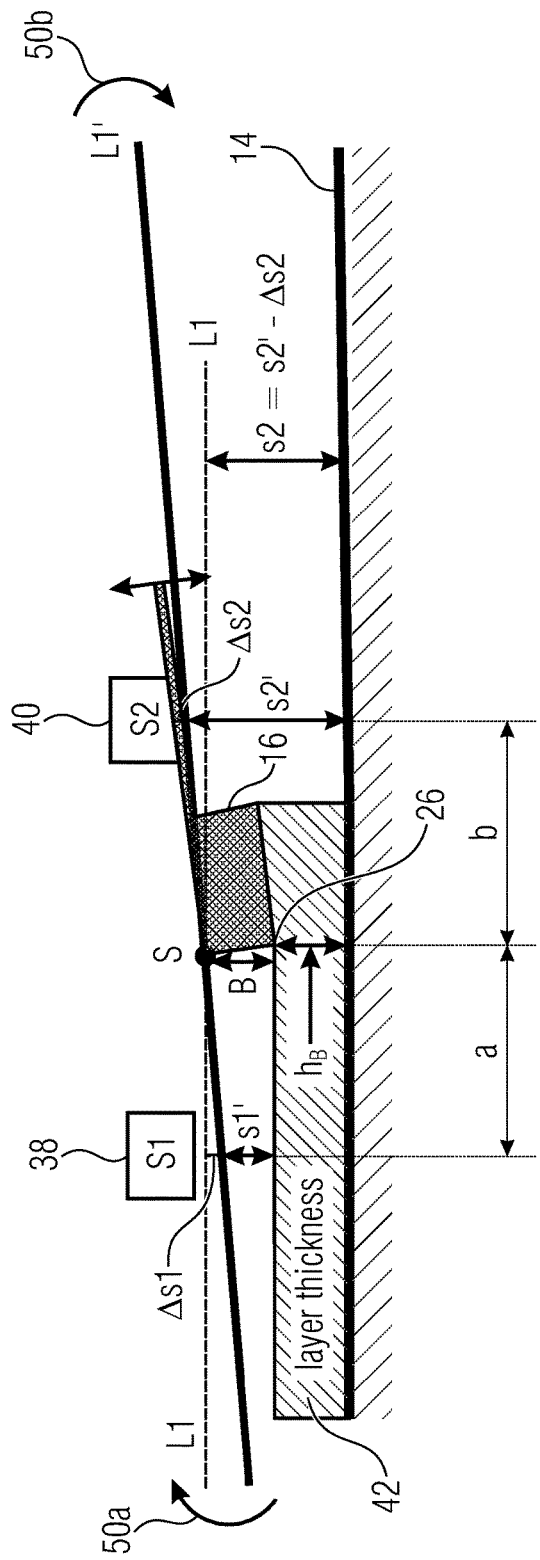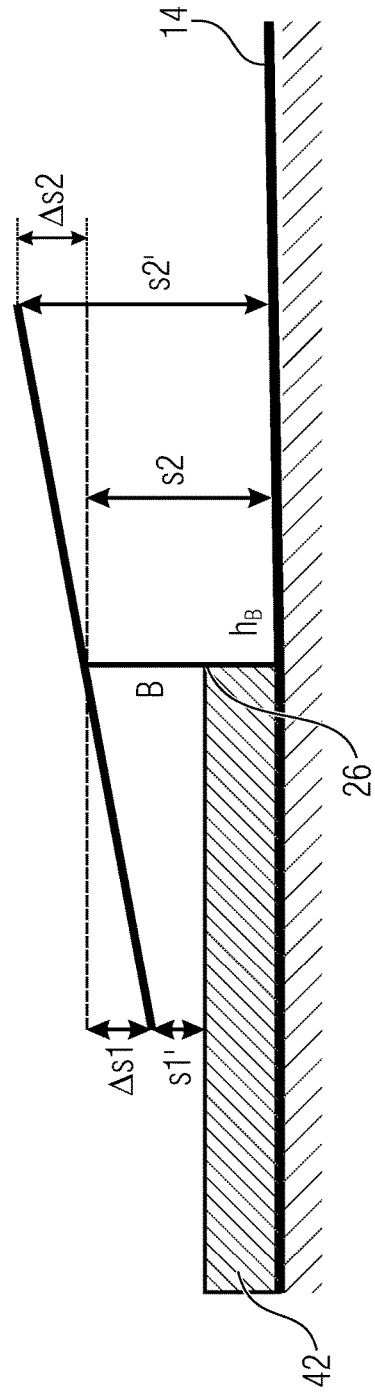
Fig. 6
Fig. 7

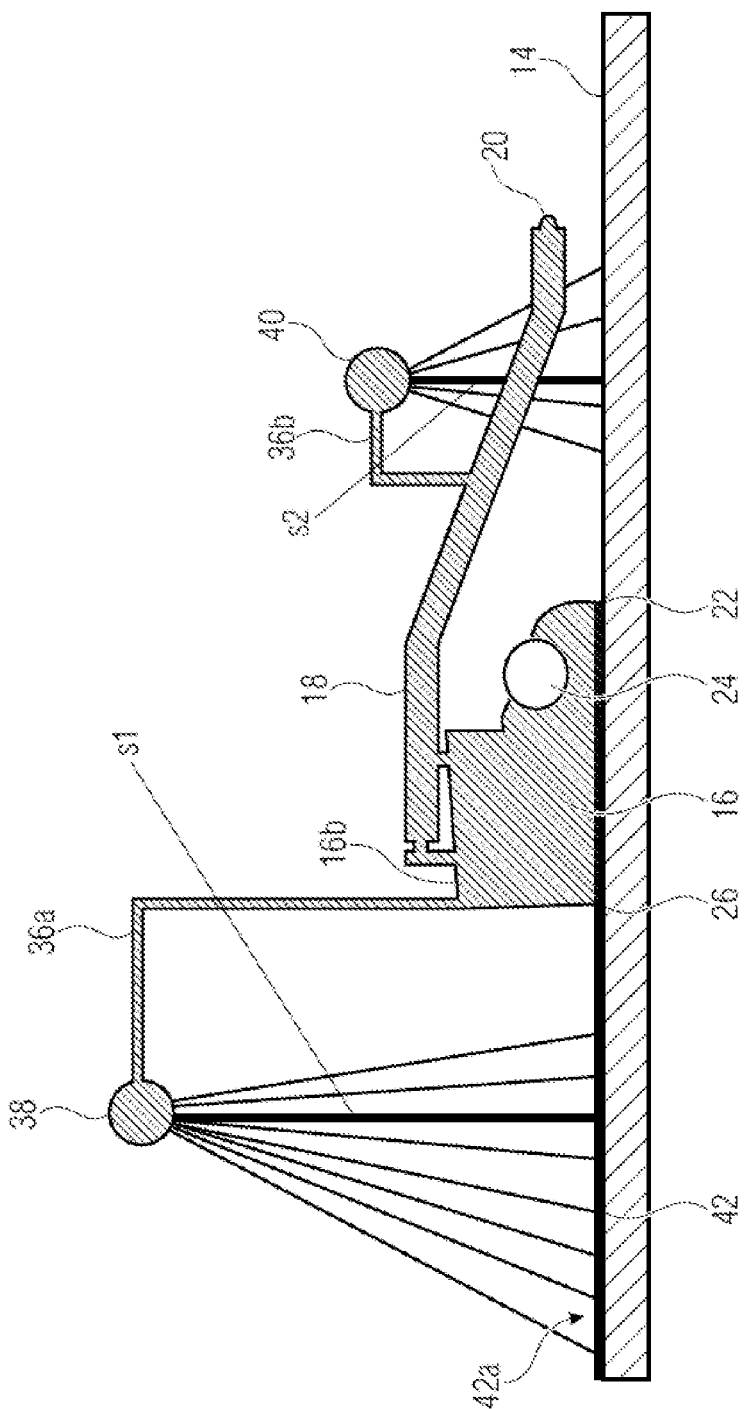

ROAD PAVER HAVING LAYER THICKNESS DETECTING DEVICE, AND METHOD FOR DETECTING THE THICKNESS OF AN APPLIED MATERIAL LAYER

CROSS-REFERENCE TO RELATED APPLICATIONS

This application is a continuation of copending International Application No. PCT/EP2015/055555, filed Mar. 17, 2015, which is incorporated herein by reference in its entirety, and additionally claims priority from European Application No. EP 14160503.0, filed Mar. 18, 2014, which is incorporated herein by reference in its entirety.

The present invention relates to a road paver (road finisher), in particular a road paver having a layer thickness detecting device, and to a method for detecting the thickness of a material layer applied by such a road paver.

BACKGROUND

In general a road paver on a tracked drive runs on a prepared foundation (road bed) onto which a street surface to be produced or road pavement to be produced is to be applied. As a rule the road pavement is a bituminous material, wherein however layers with sand or stone or concrete layers may also be added in. Provided behind the road paver, in the direction of travel, is a height-adjustable screed, and piled on its front side is a supply of the road paving material that is supplied and distributed by a conveyor device that makes sure that the amount of road paving material kept on the front side of the screed is adequate but is not too much. The height of the rear edge of the screed relative to the surface of the prepared foundation, which may also be formed by an old road pavement covering, establishes the thickness of the street surface produced prior to its subsequent further consolidation by rollers. The screed is held on a tow arm that is borne rotatably movable about a tow point arranged in the center area of the road paver, the height of the screed being determined by a hydraulic adjusting device.

FIG. 1 depicts a known road paver as is described for instance in EP 0 542 297 A1. The road paver overall is labeled 10 and includes a tracked drive 12 with which the road paver 10 travels on the prepared foundation 14. Arranged on the back end of the road paver 10, as seen in the direction of travel, is a height-adjustable screed 16 that is linked to the road paver 10 at a tow point 20 by means of a tow arm 18. Disposed in front of the screed 16 is a supply 22 of the asphalt material, this supply being kept constant essentially across the entire width of the screed 16 using corresponding control, known per se, of the speed of a screw-like conveyor device 24. The screed 16 floats on the asphalt of the road surface to be produced. The thickness of the road surface to be produced prior to its final consolidation by road rollers is adjusted by adjusting the height of the rear edge 26 of the screed 16. This height adjustment is initiated by changing the setting angle of the screed 16, and is typically accomplished by actuating adjusting cylinders that engage at the front ends of the tow arms 18. The road paver includes three ultrasound sensors 28, 30, 32 that are attached to a mount 34. The mount 34 is attached to the tow arm 18. The three ultrasound sensors 28, 30, 32 scan a reference surface that may be formed for instance by an old path of the road cover or by a path of the road cover that has already been produced.

When building a road, it is desirable to measure the produced layer as continuously and in real time as possible. Determining the layer thickness is desired for instance to check the quality of the newly applied road pavement. If the calculated thickness of, for instance, a bituminous layer is too low, there is the risk that the road pavement will break up prematurely, which results in expensive repairs to the road pavement. On the other hand, the layer thickness may be checked with respect to the quantity of material used so that the quantity of material used is not too high, which would lead to increased costs.

Known systems for determining the layer thickness of newly applied road pavement are described for instance in EP 2 535 456 A1, EP 2 535 457 A1, and EP 2 535 458 A1. It is a drawback of these known systems that they are mechanically complex and complicated in terms of signal processing and yet still do not have adequate accuracy when determining the layer thickness.

U.S. Pat. No. 7,172,363 B2 describes a road paver having a sensor frame which comprises lateral height sensors, front height sensors in front of the screed and rear height sensors behind the screed, each of which measures the distance from the foundation. The sensor frame is rigidly attached to the screed and/or to the tow arm.

SUMMARY

According to an embodiment, a road paver may have: a screed for applying a material layer to a foundation; a layer thickness detecting device for detecting the thickness of the material layer applied, wherein the layer thickness detecting device includes a first sensor behind the screed, in the direction of travel, for detecting a first distance from the applied material layer and a second sensor in front of the screed, in the direction of travel, for detecting a second distance from the foundation, and wherein the layer thickness detecting device is immovably attached to the screed; wherein the layer thickness detecting device includes a signal processing unit, the signal processing unit being configured to detect the layer thickness of the applied material layer on the basis of the sensor signals from the first sensor and from the second sensor, of the distances of the first sensor and of the second sensor from the rear screed edge, and of the attachment heights of the first sensor and of the second sensor relative to the rear screed edge, and wherein the data detected by the layer thickness detecting device regarding the layer thickness is used for actively controlling the road paver with respect to a position of the screed in order to maintain a pre-specified layer thickness.

According to another embodiment, a method for detecting the thickness of a material layer applied to a foundation by using a road paver by means of a thickness detecting device immovably attached to a screed of the road paver and including a first sensor behind the screed, in the direction of travel, for detecting a first distance from the applied material layer and a second sensor in front of the screed, in the direction of travel, for detecting a second distance from the foundation, may have the steps of: detecting a first distance from the applied material layer; detecting a second distance from the foundation; and determining the layer thickness of the material layer applied; wherein the layer thickness is determined on the basis of the detected first and second distances, of the distances of the first sensor and of the second sensor from the rear screed edge, and of the attachment heights of the first sensor and of the second sensor relative to the rear edge of the screed of the road paver, and wherein a position of the screed is controlled in response to the determined layer thickness in order to maintain a pre-specified layer thickness.

According to another embodiment, a road paver may have: a screed for applying a material layer to a foundation; and a layer thickness detecting device for detecting the thickness of the material layer applied, wherein the layer thickness detecting device includes a first sensor behind the screed, in the direction of travel, for detecting a first distance from the applied material layer and a second sensor in front of the screed, in the direction of travel, for detecting a second distance from the foundation, wherein the layer thickness detecting device includes a rigid first support that is attached to the screed and a second support that is attached to a tow arm, which rotates the screed, wherein the first sensor is attached to the first support and the second sensor is attached to the second support, and wherein the layer thickness detecting device includes a signal processing unit configured to detect the layer thickness of the applied material layer on the basis of the sensor signals from the first sensor and from the second sensor, of the distances of the first sensor and of the second sensor from the rear screed edge, and of the attachment heights of the first sensor and the second sensor relative to the rear screed edge.

According to another embodiment, a method for detecting the thickness of a material layer applied to a foundation by using a road paver by means of a thickness detecting device including a rigid first support that is attached to the screed, a second support attached to a tow arm, which rotates the screed, a first sensor, which is attached to the first support, for detecting a first distance from the material layer applied, and a second sensor, which is attached to the second support, for detecting a second distance from the foundation, may have the steps of: detecting a first distance from the applied material layer; detecting a second distance from the foundation; and determining the layer thickness of the material layer applied; wherein the layer thickness is determined on the basis of the detected first and second distances, of the distances of the first sensor and of the second sensor, and of the attachment heights of the first sensor and of the second sensor relative to the rear edge of the screed of the road paver.

The inventive road paver is advantageous because the layer thickness detecting device is securely attached to the screed so that it is possible to more accurately detect the layer thickness since the measuring device is attached to the point at which the actual application takes place. The origin of a coordinate system for detecting the layer thickness is disposed at exactly the point at which the material is actually applied. Furthermore, the inventive approach facilitates installation, since the layer thickness detecting device only has to be attached to the screed; in particular it is not necessary to attach it to any other area of the road paver, which has a negative effect on the measuring system e.g. because of the movement of the road paver.

Moreover, the inventive approach is advantageous since only easily determinable variables are used in the calculation, specifically the distance signals detected by the sensors and the easily determinable distances between the sensors and the rear screed edge, so that the layer thickness is determined accurately, in a simple manner with uncomplicated signal processing, relative to the point at which the layer is applied, specifically relative to the rear screed edge.

In accordance with embodiments, the distances of the first sensor and of the second sensor from the rear screed edge and the attachment heights of the first sensor and of the second sensor relative to the rear screed edge are the same, and the signal processing unit is configured to detect the layer thickness of the applied material layer based on the sensor signals from the first sensor and from the second sensor and from the attachment height of the first sensor and of the second sensor relative to the rear screed edge.

The inventive approach in accordance with this embodiment is advantageous because, assuming that the distances of the sensors from the rear screed edge are the same, determining the layer thickness may be significantly simplified, wherein during a first, good approximation for small angle changes only the sensor attachment heights and the sensor signals are added to the calculation.

The layer thickness of the applied material layer may be determined as follows:

$$h_b = s_2 + s_1 - 2B$$

where:
$h_B$=layer thickness of the applied material layer,
$s_1$=first distance from the applied material layer detected by the first sensor,
$s_2$=second distance from the foundation detected by the second sensor, and
B=attachment height of the first sensor and of the second sensor relative to the rear screed edge.

In accordance with further embodiments, the attachment heights of the first sensor and of the second sensor relative to the rear screed edge are the same, and the layer thickness of the applied material layer may be determined as follows:

$$h_b = s_2 + \frac{b}{a}s_1 - B\left(\frac{b}{a} + 1\right)$$

where:
$h_B$=layer thickness of the applied material layer,
$s_1$=first distance from the applied material layer detected by the first sensor,
$s_2$=second distance from the foundation detected by the second sensor,
B=attachment height of the first sensor and of the second sensor relative to the rear screed edge,
a=distance of the first sensor from the rear screed edge, and
b=distance of the second sensor from the rear screed edge.

The inventive approach in accordance with this embodiment is advantageous because it makes it possible to calculate the layer thickness in a simple manner, wherein the sensors may also be arranged, depending on circumstances, at different distances from one another with respect to the rear screed edge, wherein the calculation is simplified because the sensors are installed at the same height relative to the rear screed edge.

In accordance with further embodiments, the attachment heights of the first sensor and of the second sensor relative to the rear screed edge are the same, and the layer thickness of the applied material layer may be determined as follows:

$$h_b = s_2 - c_2 \cdot \sin\left[\alpha_2 + \left(\alpha_1 - \arcsin\frac{s_1}{c_1}\right)\right]$$

where:

$$c_1 = \sqrt{a^2 + B^2},$$

$$c_2 = \sqrt{b^2 + B^2},$$

$$\alpha_1 = \arcsin\frac{B}{\sqrt{a^2 + B^2}},$$

-continued
$$\alpha_2 = \arcsin\frac{B}{\sqrt{b^2+B^2}},$$

$h_B$=layer thickness of the applied material layer,
$s_1$=first distance from the applied material layer detected by the first sensor,
$s_2$=second distance from the foundation detected by the second sensor,
B=attachment height of the first sensor and of the second sensor relative to the rear screed edge,
a=distance of the first sensor from the rear screed edge, and
b=distance of the second sensor from the rear screed edge.

The inventive approach in accordance with this embodiment is advantageous because highly accurate determination of the layer thickness is made possible, wherein the calculation algorithm is optimized in that the rotation point of the measuring device is assumed exactly on the rear screed edge.

The inventive approach in accordance with this embodiment is advantageous because due to the sensors being attached at a height relative to the rear screed edge that is the same as the thickness of the screed, the determination of the attachment height is significantly simplified; for instance, the known thickness or height of the screed may simply be used for the attachment height without other steps for determining the same being necessary.

In accordance with further embodiments, the attachment heights of the first sensor and of the second sensor relative to the rear screed edge are the same, and the signal processing unit is configured to perform a calibration for determining the attachment height, wherein during the calibration the first sensor detects the distance from the foundation.

The inventive approach in accordance with this embodiment is advantageous because during a calibration process it is possible in a simple manner to determine the attachment heights of the first sensor and of the second sensor, which are the same, in that during the calibration the first sensor also determines the distance from the foundation. Thus, in accordance with the invention it is possible in a simple manner to determine the attachment height, which is also possible if the sensors are attached at the height of the upper screed edge, in order to determine a most accurate possible attachment height.

The attachment height of the first sensor and of the second sensor relative to the rear screed edge may be determined as follows:

$$B = \frac{s_2 + s_1}{2},$$

where:
$s_1$=first distance from the foundation detected by the first sensor,
$s_2$=second distance from the foundation detected by the second sensor,
B=attachment height of the first sensor and of the second sensor relative to the rear screed edge.

In accordance with further embodiments, the layer thickness detecting device includes at least one support that is attached to the screed, wherein the first sensor is arranged on the support at a first distance from the rear screed edge, and wherein the second sensor is arranged on the support at a second distance from the rear screed edge.

The inventive approach in accordance with this embodiment is advantageous because when using the support the distance of the sensors from the rear screed edge may be adjusted with nothing further so that the first sensor reliably scans the applied material layer and the second sensor reliably scans the foundation.

In accordance with embodiments, the support includes a measuring bar that is attached to the screed, wherein the first sensor is arranged at a first end of the measuring bar at a first distance from the rear screed edge, and wherein the second sensor is arranged at a second end of the measuring bar at the second distance from the rear screed edge.

In accordance with embodiments, the measuring bar is rigid and is immovably attached to a top side of the screed.

The use of a measuring bar in accordance with this embodiment is advantageous because this permits simple attachment of the measuring arrangement to the screed, wherein, in particular due to the fact that the measuring bar already includes the sensors at each of its ends, simple attachment to the screed and in particular also simple orientation of the sensors relative to the screed is assured. In other embodiments it may be provided that a plurality of such measuring bars having corresponding sensors are arranged along the width of the screed. Simple and reliable measurement is assured due to the rigid embodiment of the measuring bar and the movable attachment thereof to the top side of the screed.

In accordance with other embodiments, the support includes a first rigid support that is immovably attached to the screed and on which the first sensor is arranged at the first distance from rear screed edge, and a second rigid support that is immovably attached to the screed and on which the second sensor is arranged at the second distance from the rear screed edge.

This embodiment is advantageous because, instead of a common measuring bar for attaching the two sensors, it is also possible to provide separate measuring bar or separate rigid supports in order, regardless of the circumstances, to arrange the first sensor and the second sensor at different positions relative to the rear screed edge and relative to the rear screed edge, for instance at different distances from the rear screed edge and/or at different attachment heights.

In accordance with embodiments, the first sensor and the second sensor include ultrasound sensors, laser sensors, microwave sensors, or even a combination thereof.

Thus, in accordance with the invention an approach is provided that permits continuous determination of the layer thickness on a road paver, which determination represents one of the most important tasks for determining quality parameters when laying asphalt. Although the different measuring methods mentioned above are known in conventional technology for determining the layer thickness when laying asphalt, these do not attain an accuracy that is within an acceptable range that may reasonably be used for this purpose. Therefore, in accordance with the invention an approach is taught in which the layer thickness measurement uses a measuring method that has increased accuracy, which is in particular attained in that a measuring device is provided that is securely installed on the screed.

BRIEF DESCRIPTION OF THE DRAWINGS

Embodiments of the present invention will be detailed subsequently referring to the appended drawings, in which.

FIG. 6 depicts the screed geometry depicted in FIG. 3, now inclined;

FIG. 7 depicts the derived measured variables explained using FIG. 6 and their geometric relationships;

DETAILED DESCRIPTION OF THE INVENTION

The same or equivalent elements are provided with the same reference numbers in the following description of embodiments of the invention.

Figure 1:
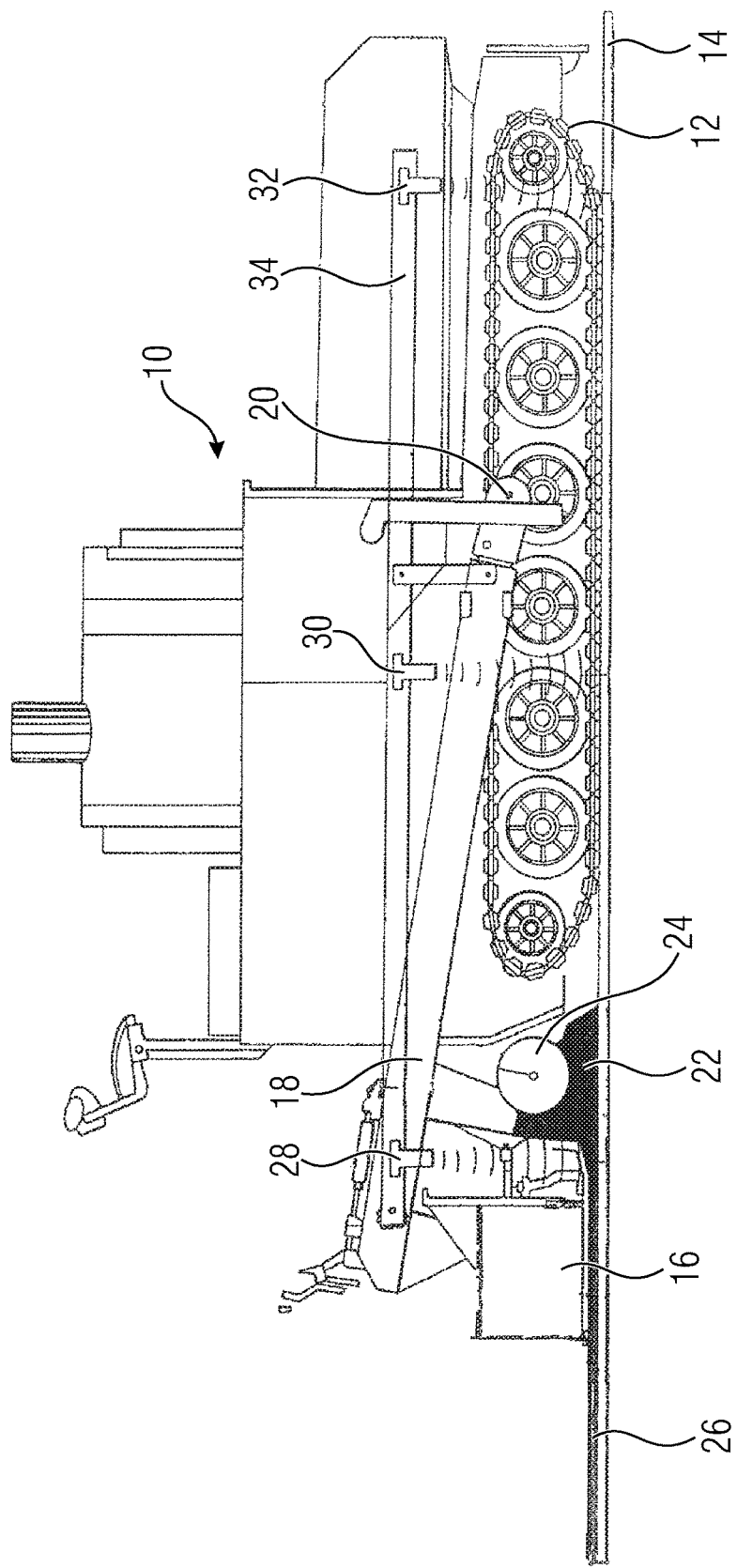
FIG. 1 depicts a known road paver.
Figure 2:
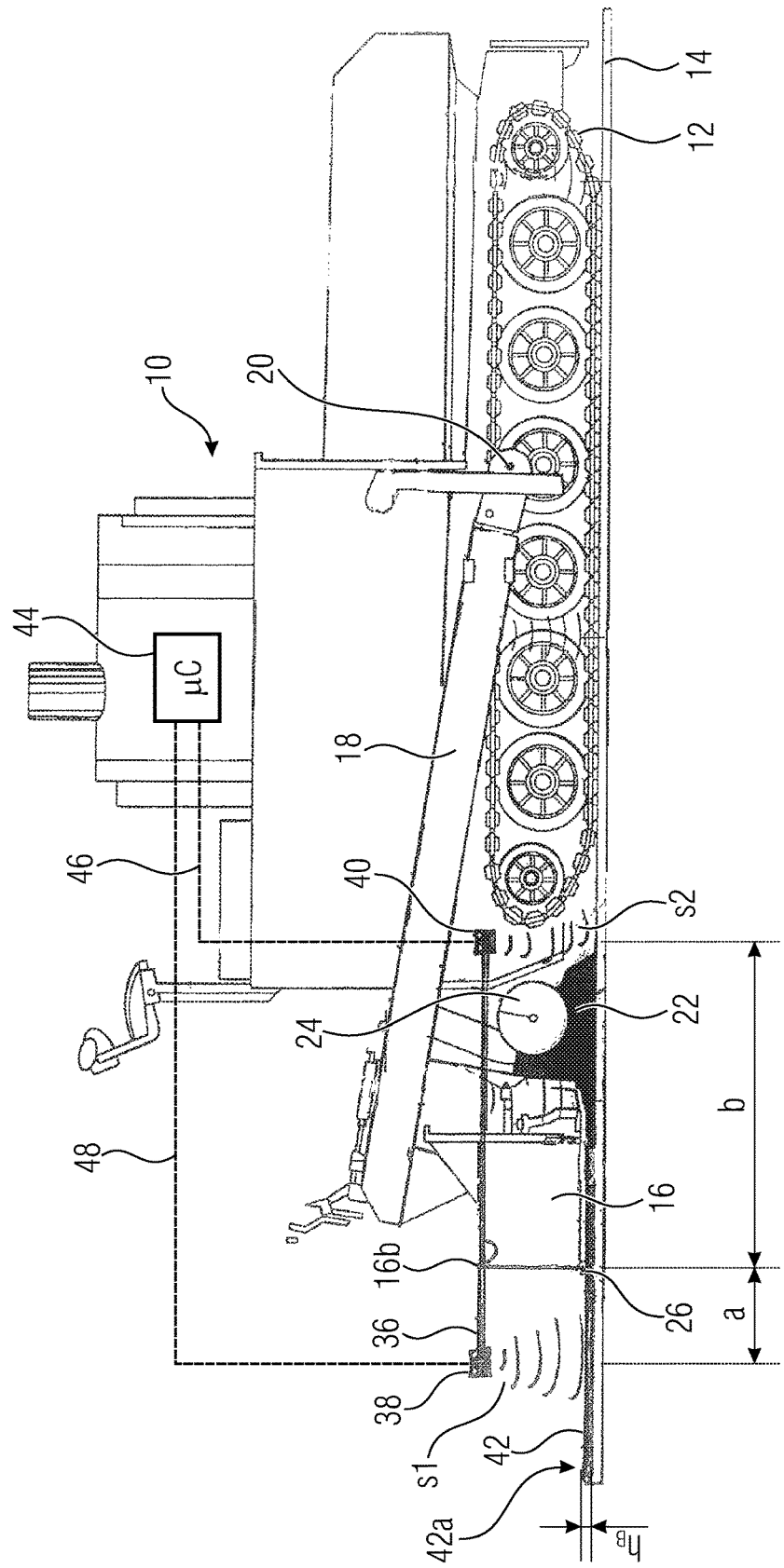
FIG. 2 depicts a road paver in accordance with one embodiment of the present invention.

FIG. 2 depicts a road paver in accordance with one embodiment of the present invention. The road paver depicted in FIG. 2 is similar to the road paver depicted in FIG. 1, but includes the inventive layer thickness detecting device. The road paver depicted in FIG. 2 does not include the ultrasound sensors depicted in FIG. 1 or the depicted mount; instead, the inventive layer thickness detecting device is attached to the screed 16. Alternatively, the sensors depicted in FIG. 1 may be retained for controlling the application of the material layer. In the embodiment depicted in FIG. 2, the inventive layer thickness detecting device includes a support 36 that is rigidly and immovably attached to the top side of the screed 16 so that the support 36 moves with the screed 16. A first sensor 38 is arranged at a first end of the support 36 at a distance a from the rear screed edge 26 behind the screed 16 in the direction of travel. A second sensor 40 is arranged at a second end of the support 36 at a distance b from the rear screed edge 26 in front of the screed 16 in the direction of travel; it is likewise an ultrasound or laser sensor that generates a distance signal s2. The first sensor 38 may be an ultrasound sensor, a laser sensor, or a microwave sensor, and it generates a distance signal s1 that indicates the distance of the first sensor 38 from the surface 42a of the applied layer 42. The second sensor 40 may be an ultrasound sensor, a laser sensor, or a microwave sensor, and it generates a distance signal s2 that indicates the distance of the second sensor 40 from the foundation 14. The layer thickness detecting device furthermore includes a signal processing device 44 that is depicted schematically in in FIG. 2 and that may be for instance part of a control for the road paver 10. Alternatively, the signal processing device may also be provided independently of other elements of the road paver. In the embodiment depicted, the signal processing device 44 may be embodied as a microcontroller that receives data from the sensors 38 and 40 via schematically depicted connections 46, 48, which data reflect the measured distances s1 and s2. The signal processing device 44 determines the layer thickness $h_B$ of the applied layer 42 on the basis of the received distance signals s1 and s2 and on the basis of the distances a, b of the sensors 38, 40 from the rear screed edge 26 and on the basis of the attachment height B of the sensors 38 and 40 relative to the rear screed edge 26 or above the rear screed edge 26. The signal processing device 44 may detect, output, and/or store the layer thickness $h_B$ continuously or at fixed predetermined time intervals, wherein for this purpose the signal processing device may furthermore include a memory and/or a display (not shown in greater detail in FIG. 2).

In the embodiment depicted in FIG. 2, the support 36 is depicted schematically and is rigidly and immovably attached to an upper screed edge 16b so that the support 36 and thus also the sensors 38 and 40 move with the screed such that, as mentioned above, the layer thickness $h_B$ of the applied layer 42 may be determined in the manner described in greater detail in the following by means of a calculation algorithm executed in the processing device 44. In such a case the attachment height of the sensors 38, 40 above the rear screed edge 26 is a height that equals the thickness B or the height B of the screed 16.

The inventive approach to measuring the layer thickness, for instance when laying asphalt with the road paver 10 depicted in FIG. 2, is based on the fact that the two height sensors 38, 40 are provided that are arranged in a line along the road paver 10 direction of travel and, in accordance with one embodiment, are arranged in a distance-symmetrical manner relative to the rear screed edge 26 such that the sensor 38 measures the distance s1 from the asphalt surface 42a of the applied asphalt layer 42 and such that the sensor 40 measures the distance s2 from the foundation 14. The two sensors 38, 40 are rigidly connected, by means of the support 36, to the paver screed 16, in particular such that there can be only minor twisting.

Figure 3:
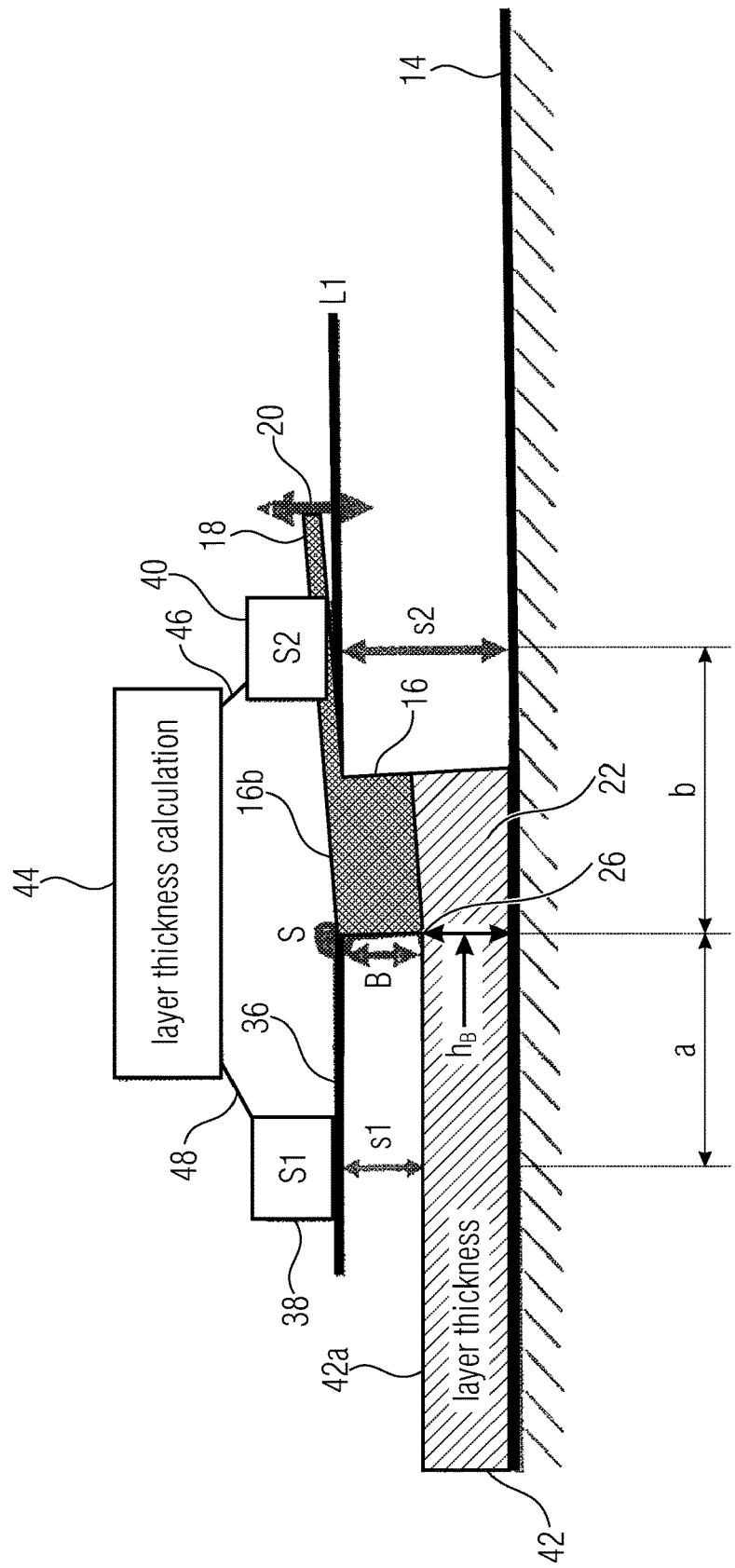
FIG. 3 is a schematic depiction of the screed geometry as it is used for instance in a road paver like the one illustrated in FIG. 2.
Figure 4:
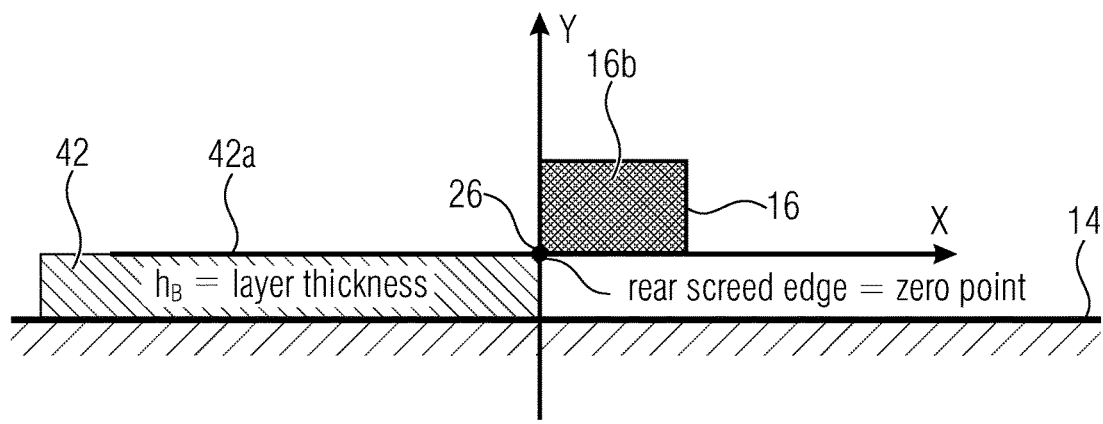
FIG. 4 depicts the position of the X-Y coordinate system relative to the rear screed edge.

In the following the inventive approach for determining the layer thickness in accordance with a first embodiment is explained in greater detail using FIG. 3. FIG. 3 is a schematic depiction of the screed geometry such as may be used for instance in a road paver as depicted in FIG. 2, but also in other road pavers. FIG. 3 depicts the schematic structure for the layer thickness measurement using the distance sensors 38 and 40 and using as a basis the associated distance measurements s1 and s2. FIG. 3 depicts a point of symmetry S that is disposed directly above the rear screed edge 26 and through which passes the line L1 illustrated in FIG. 3. In accordance with the depicted embodiment, as mentioned in the foregoing, the sensors 38, 40 are rigidly connected via the support 36 to the paver screed 16, and specifically such that no twisting occurs in the direction of the imaginary line L1, especially no vertical twisting. The distance B, which the application height of the sensors relative to the rear screed edge 26 provides, is disposed between the point of symmetry S and the surface 42a of the applied asphalt layer 42. In the depicted embodiment, the distance B represents a nearly constant value, even if the screed 16 is moved over the tow point 20 in the longitudinal inclination. The line L1 represents a reference line for the sensors 38 and 40, and at the same time also the attachment height or mounting height relative to the point of symmetry S. In this context, the line L1 may also be called the mounting reference line. The distances a and b are the distances or the installation distances between the sensors 38 and 40 and the rear screed edge 26 or the point of symmetry S. The coordinate system for the layer thickness measurement using the sensors 38 and 40 is directly on the rear screed edge 26, as is illustrated in FIG. 4, which depicts the position of the X-Y coordinate system relative to the rear screed edge 26. More specifically, the zero point for Y in the coordinate system is directly on the rear screed edge 26, the scraper edge determining the zero point for X. The coordinate system follows the movement of the rear screed edge 26 during the application process, wherein the X axis in its negative extension from the zero point coincides with the road surface 42a.

Figure 5:
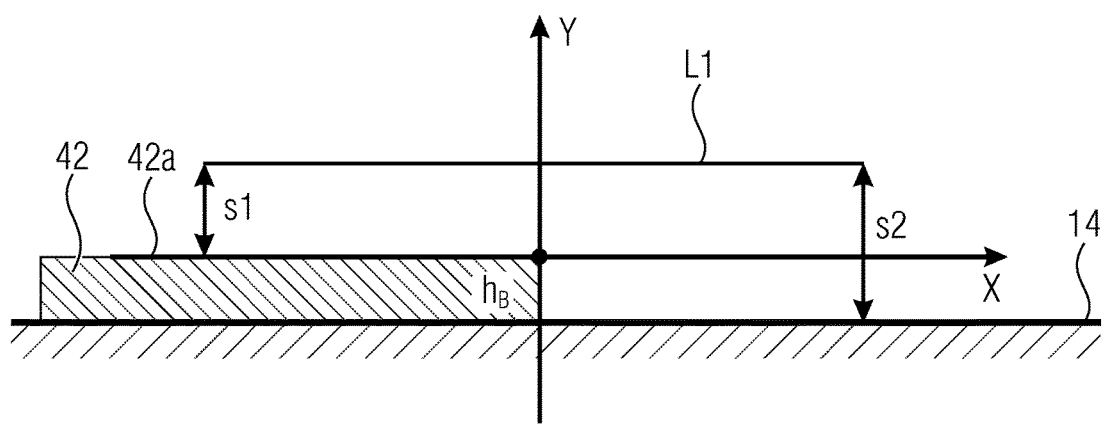
FIG. 5 depicts the coordinate system (X-Y coordinate system) explained using FIG. 4 with variables derived for the layer thickness measurement.

In the following, refer to FIG. 5, which extracts the measured variables for the layer thickness measurement, for the derivation of the formula used in accordance with the first embodiment for the layer thickness $h_B$. FIG. 5 depicts the coordinate system (X-Y coordinate system) explained with FIG. 4, as well as the thickness $h_B$ of the applied layer 42 and the measured distance values s1 and s2 of the sensors, which were explained in FIG. 2, specifically the distances from the asphalt surface 42a and from the foundation 14, proceeding from the line L1, which is spaced apart from the zero point of the coordinate system in the positive Y direction by the installation height B of the sensors. In the embodiment just described it is assumed that the sensors 38 and 40 are equidistant from the zero point, that is that they are the same distance from the zero point along the X direction. With the geometry described using FIGS. 3 through 5 as the basis, in accordance with the depicted embodiment the layer thickness $h_B$ may be found as follows:

$$h_B = s_2 + s_1 - 2B \quad (1)$$

If the inclination of the reference line L1 (see FIG. 3) changes symmetrically about the Y coordinate axis, the equation provided above essentially remains valid, since the sum of the signals s1+s2 remains nearly constant, as will be explained in greater detail hereinafter. The derivation of the above equation (1) shall be described in greater detail in the following, the following being assumed in accordance with the depicted embodiment:

- the distances a, b between the 38, 40 and the rear screed edge 26 (point of symmetry S) are equal, i.e. a=b;
- the sensors 38 and 40 are disposed on the imaginary line L1 and are rigidly connected to the screed 16, for instance by means of the support 36;
- the sensor 38 measures the distance s1 from the asphalt surface 42a;
- the sensor 40 measures the distance s2 from the foundation 14;
- the distance B is constant and represents the distance between the line L1 and the rear edge 26 of the screed 16 in the Y direction; and,
- the line L1 initially runs parallel to the foundation 14.

Using the above assumptions as a basis, the layer thickness may be found directly in accordance with the following equation:

$$h_B = s_2 - s_1 = s_2 - B \quad (2)$$

The line L1 may incline due to a movement of the screed, FIG. 6 depicting a change to the inclination of the measurement system. Due to a change in the position or inclination of the line L1 to line L1', symmetrically about the point of symmetry S, for instance due to a change in the screed setting angle, as is shown in FIG. 6, the measured values s1 and s2 change symmetrically by $\Delta s1$ and $\Delta s2$. For the equation (2) to remain true, the line L1' is realigned parallel to the foundation 14, which is attained in that the line L1' is rotated by the value $\Delta s1$ or $\Delta s2$ relative to the point of symmetry S, as is depicted as an example by the arrows 50a and 50b in FIG. 6. If the value s2' is now corrected by $\Delta s2$, s2' being the measured value that is detected by the sensor 40 during the change in screed inclination, the result is again the original measured value s2, that is, the measured value that would result for the imaginary line L1 that runs parallel to the foundation 14 (coordinate axis X). The value $\Delta s2$ may not be directly measured, however, and merely represents an auxiliary value that may be solved in the equations. FIG. 7 clarifies derived measured values explained using FIG. 6 and their geometric relationships. The relationship mentioned above between the measured value s2' actually measured by the sensor 40 and the measured value s2 originally detected for the horizontal line L1 is as follows:

$$s_2 = s_2' - \Delta s_2 \quad (3)$$

If one uses equation (3) in equation (2), the result is:

$$h_B = s_2 - B = s_2' - \Delta s_2 - B \quad (4)$$

The value $\Delta s2$, which as mentioned above is not directly measurable, is now described using the measured value s1' from the first sensor 38 and the attachment height B, wherein, as results from FIG. 7, the following is true for reasons of symmetry:

$$\Delta s_2 = \Delta s_1 = B - s_1' \quad (5)$$

If equation 5 is used in equation 4, the result is:

$$h_B = s_2' - (B - s_1') - B \quad (6)$$

Once solved, this provides:

$$h_B = s_2' + s_1' - 2B \quad (7)$$

In equation (7), s1' and s2' are the distances measured by the sensors, wherein equation 1 results by generalizing the measured values s1' and s2' to the measured values s1 and s2, specifically, $$h_B = s_2 + s_1 - 2B \quad (8)$$

In accordance with the invention the layer thickness is thus obtained in accordance with the depicted embodiment by adding the measured values obtained by the sensors and subtracting twice the constant B, as is shown above. In accordance with the exemplary embodiment, a simple calculation guide is provided that permits a layer thickness to be determined with high accuracy, simple mechanical embodiment of the measuring device, and a simple calculation algorithm.

In the embodiments described above, for the sake of simplicity it was assumed that the distances between the sensors 38, 40 and the rear screed edge 26 are the same, but this is not necessarily required, and indeed may also not be possible, especially depending on circumstances that may be imposed by the structure of the road paver. However, the inventive approach also works for a non-symmetrical structure in which the distances a and b of the sensors 38 and 40 from the rear screed edge 26 are different. In this case it is merely useful to correct the aforesaid correction variables $\Delta s2$ and $\Delta s1$ according to the intercept theorem, and the following relationship results:

$$\frac{\Delta s_1}{a} = \frac{\Delta s_2}{b} \quad (9)$$

It follows from equation (9):

$$\Delta s_2 = \frac{b}{a} \cdot \Delta s_1 \quad (10)$$

If the above derivation of equations 3 through 8 is performed again, this time using equation 9, the result is:

$$h_B = s_2 - \left(\frac{b}{a} \cdot [B - s_1]\right) - B \quad (11)$$

from which, after solving, the layer thickness is found as follows:

$$h_B = s_2 + \frac{b}{a}s_1 - B\left(\frac{b}{a} + 1\right) \quad (12)$$

In equation 11 the constant B reflects the attachment height for the sensors 38 and 40 relative to the rear screed edge 26, as was explained above using FIGS. 3 and 5, the constant B being equal to the height of the screed in the advantageous embodiments. In other embodiments, the support may be attached at a distance from the upper screed edge 16a so that in this case the constant B indicates the thickness of the screed and the additional distance by which the support is above the screed. In yet other embodiments, the attachment height of the sensors 38 and 40 relative to the rear screed edge 26 may be less than the screed thickness.

In accordance with embodiments it may be provided that the system is calibrated prior to starting the application in order to reliably determine the constant B for the subsequent determination of the layer thickness. Proceeding from equation 1, the constant B may be calculated as follows:

$$B = \frac{s_2 + s_1 - h_B}{2}$$

This constant may be determined during a system calibration and remains stored as a constant characteristic value in the layer thickness measuring system. During the system calibration that is performed prior to the actual application of the layer 42, a measurement is taken by means of the sensors 38 and 40, now both with reference to the foundation 14, because due to the lack of the layer 42 the layer thickness provided in equation 12 is zero so that during the system calibration the constant B may be determined as follows:

$$B = \frac{s_2 + s_1}{2}$$

Figure 8:
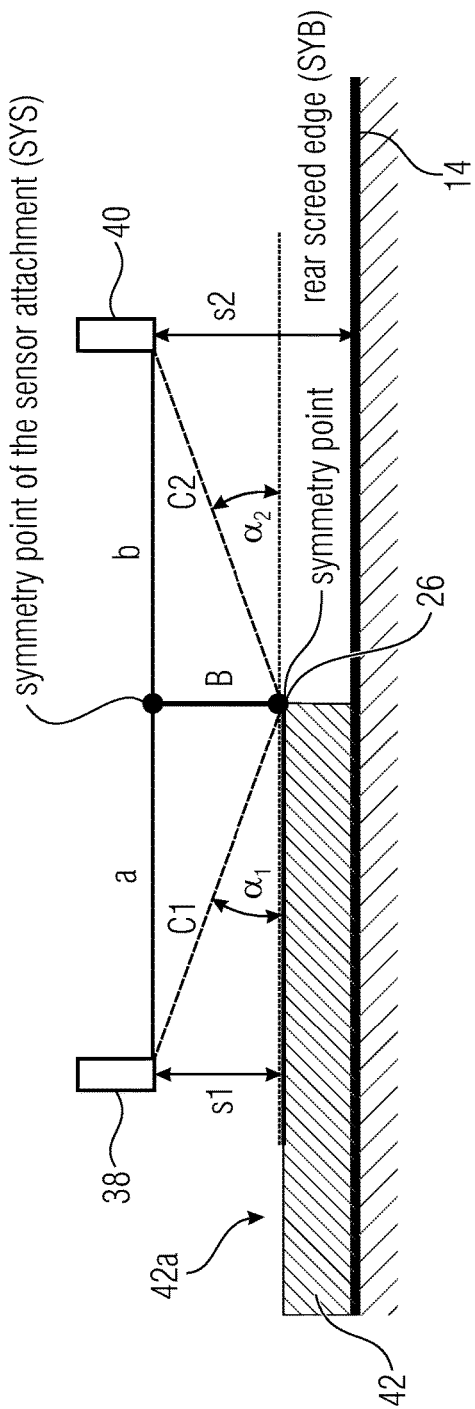
FIG. 8 is a schematic depiction of the geometric characteristics that are used determining the layer thickness with increased accuracy.

The embodiments described in the above represent a first, good approximation for the layer thickness calculation, which provides very good and accurate results, especially at small angle changes, as demonstrated in a series of experiments and tests. Furthermore, this simplified approach is suitable for determining the constant B during a system calibration. Described in the following are embodiments in which an even more accurate calculation of the layer thickness is made possible, wherein for further optimization, proceeding from the first embodiment described above, the rotation point of the measuring device is assumed to be at the rear screed edge 26. FIG. 8 is a schematic depiction of the geometric characteristic values that are used for determining the layer thickness with increased accuracy. In FIG. 8, the point of symmetry S, which in the simplified calculation was still assumed to be at the upper screed edge, that is, where the support is attached, is now assumed to be at the rear screed edge 26. What this leads to is that the sensors 38, 40 execute at type of pivot movement that does not lead a symmetrical position change for the sensors 38, 40 with regard to the screed coordinate system depicted in FIG. 4. As was already explained using FIG. 4, the coordinate system for the calculating the layer thickness relates to the rear screed edge and the newly laid asphalt layer 42, wherein the high point of the coordinate system is at the rear screed edge 26, and the X axis is in the surface 42a of the asphalt layer that has already been laid. The coordinate system defined in this manner is called the screed coordinate system, and is defined during the application. However, during the application itself the screed 16 may change its position in the coordinate system depending on the screed setting angle.

FIG. 8 provides various constant characteristic values that are used for a very accurate calculation of the layer thickness in the inventive layer thickness determination in accordance with the embodiment. The variables a, b, and B, that is, the distances of the sensors 38 and 40 from the rear screed edge 26, are defined, as is their attachment height relative to the rear screed edge 26. Using these defined variables, it is possible to calculate the variables C1, C2, α1, α2 depicted in FIG. 8, as well as the variables α1' and α2', which will be explained later, wherein C1 and C2 are found as follows:

$$c_1 = \sqrt{a^2 + B^2}$$

$$c_2 = \sqrt{a^2 + B^2}$$

The angles α1 und α2 depicted in FIG. 8 are found as follows:

$$\alpha_1 = \arcsin\frac{B}{c_1}$$

$$\alpha_2 = \arcsin\frac{B}{c_2}$$

Taking into account the known values a, b, and B, the angles are found as follows:

$$\alpha_1 = \arcsin\frac{B}{\sqrt{a^2 + B^2}}$$

$$\alpha_2 = \arcsin\frac{B}{\sqrt{b^2 + B^2}}$$

Figure 9:
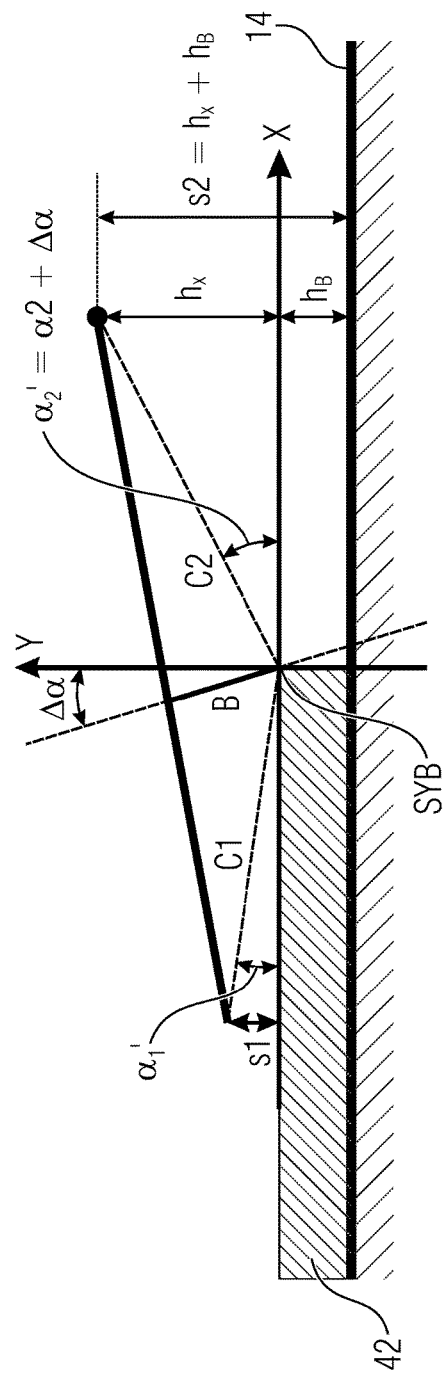
FIG. 9 is a schematic depiction of the screed geometry similar to that in FIG. 8, but for a screed tilted by the angle $\Delta\alpha$ relative to the Y axis.

FIG. 9 depicts the schematic screed geometry similar to FIG. 8, but with a screed that is tilted relative to the Y axis by the angle Δα, which results in the angles α1' and α2' already mentioned above and depicted in FIG. 9, wherein for any measured value s1 the angle α1' is calculated as follows:

$$\alpha_1' = \arcsin\frac{s_1}{c_1}$$

The rotation angle Δα may be found from α1' and α1 as follows:

$$\Delta\alpha = \alpha_1 - \alpha_1'$$

If B, C1, and C2 are considered position vectors, this rotation angle Δα acts in the same manner on these position vectors, so that the following relationship results for α2':

$$\alpha_2' = \alpha_2 + \Delta\alpha$$

The following equation may be derived from FIG. 8 for the layer thickness $h_B$:

$$h_B = s_2 - h_x$$

where for $h_x$:

$$h_B = s_2 - c_2 \cdot \sin \alpha_2' = s_2 - c_2 \cdot \sin(\alpha_2 + \Delta\alpha)$$

so that the following basis for calculation results for the layer thickness:

$$h_B = s_2 - c_2 \cdot \sin\left[\alpha_2 + \left(\alpha_1 - \arcsin\frac{s_1}{c_1}\right)\right]$$

where:

$$c_1 = \sqrt{a^2 + B^2}$$

$$c_2 = \sqrt{b^2 + B^2}$$

$$\alpha_1 = \arcsin\frac{B}{\sqrt{a^2 + B^2}}$$

$$\alpha_2 = \arcsin\frac{B}{\sqrt{b^2 + B^2}}$$

wherein B is known, for instance from the aforesaid calibration.

The aforesaid embodiments of the inventive approach for layer thickness detection are advantageous compared to conventional approaches because the inventive measurement structure is installed on the screed 16 (see FIGS. 2 and 3) in a particularly simple manner, and in accordance with embodiments may be integrated for instance into an available leveling system. In accordance with one advantageous embodiment, the distance of the sensors from the rear screed edge may be equal to the thickness of the screed so that no additional structures are needed, but instead the inventive measurement structure may simply be attached to the existing screed. Likewise, it may be advantageous to set a certain distance between the ultrasound sensors and the surface to be detected in order to maintain an optimum measuring distance.

In accordance with advantageous embodiments, the sensors are mounted relative to the rear screed edge as symmetrically as possible so that when using the calculation guide in accordance with the first embodiment the results are sufficiently accurate without it being necessary to use the highly accurate calculation algorithm. In accordance with embodiments, it may be provided that the inventive calculation algorithm implements both the first algorithm and the second, more accurate algorithm, wherein for instance, depending on a detected displacement of the screed, for instance if a limiting angle is exceeded, or if extremely accurate results are desired, the calculation of the layer thickness may be switched from the first algorithm to the second, more accurate algorithm.

Furthermore, with embodiments of the invention it may be provided that the data detected by the layer thickness measuring device regarding the layer thickness is used for actively controlling the road paver with respect to a position of the screed in order to maintain a pre-specified layer thickness.

Figure 10:
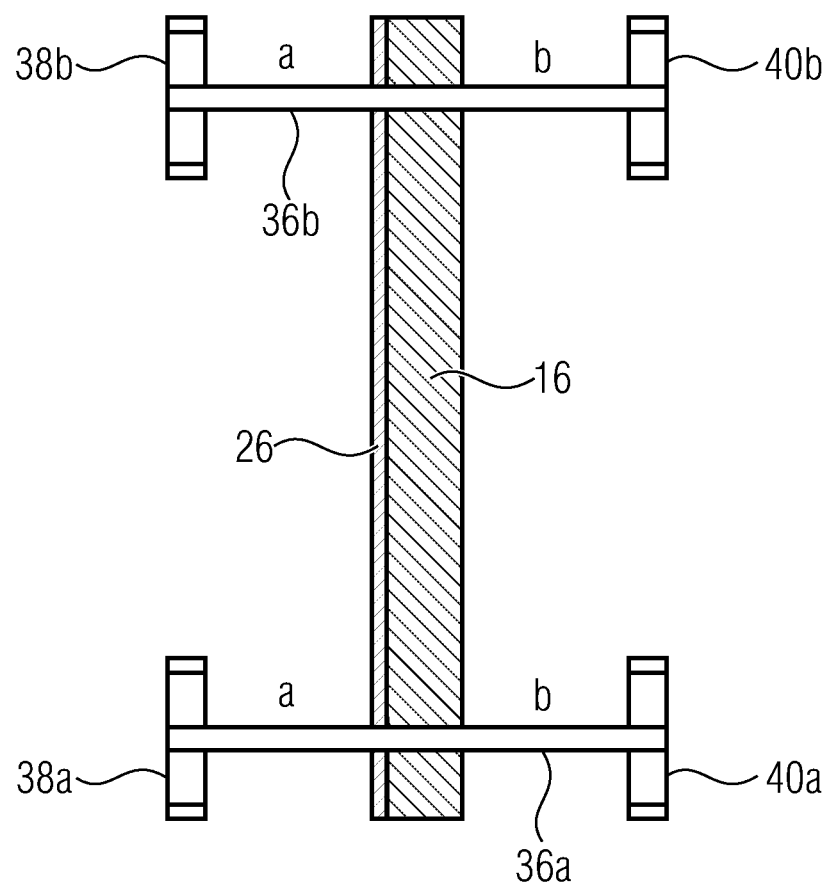
FIG. 10 is a schematic top-view of one possible installation of the layer thickness measurement system in accordance with the present invention; and, FIG. 11 is an alternative embodiment of the inventive measuring device in which the sensors are attached to the screed structure via separate, rigid supports.

Embodiments are described in the following that indicate how the sensors may be installed. FIG. 10 is a schematic top view of one possible installation of the layer thickness measuring system in accordance with the present invention.

As is depicted in FIG. 10, the system includes two supports or measuring bars 36a, 36b that are attached to the screed 16 such that first sensors 38a, 38b and second sensors 40a, 40b are arranged at the ends of the measuring bars 36a, 36b, at distances a, b from the rear screed edge 26, either on the upper screed side 16b or spaced above the upper screed side. Naturally, in addition to the arrangement depicted in FIG. 10, it is also possible to provide only one measuring bar, but it is also possible to provide more than two measuring bars with correspondingly arranged sensors systems, the plurality of sensors increasing the scanning range for the layer thickness measurement so that the measurement accuracy is higher.

FIG. 11 depicts an alternative embodiment of the inventive measuring device in which the sensors 38 and 40 are attached via separate, rigid supports 36a, 36b. As mentioned in the foregoing, it is essential that the calculation algorithm includes the attachment heights of the sensors 38 and 40, which may also differ from one another, as is depicted in FIG. 11, and includes the distances a and b between sensors 38, 40 and rear screed edge 26. Instead of as in the aforesaid embodiments in which the sensors 38, 40 are arranged on opposing ends of a support or measuring bar, in the embodiment depicted in FIG. 11 it is provided that the sensor 38 is arranged higher than the sensor 40, and specifically via a rigid support 36a attached to the upper screed edge 16b, wherein the attachment 36a is such that the sensor 38 moves together with the screed 16, advantageously such that no connections occur. The sensor 40 is attached via a second support structure 36b to the tow arm 18, which rotates the screed 16, such that both the sensor 38 and the sensor 40 are arranged in a securely determined, well defined, and unchanging relationship to the rear screed edge 26 so that the approaches described in the foregoing for determining the layer thickness of the applied layer 42 may also be employed in an embodiment in accordance with FIG. 11, wherein in this case the different heights of the sensors 38 and 40 is also taken into account.

The sensors described in the foregoing may be ultrasound sensors, but laser scanners may also be used that then provide orthogonal vectors to the foundation or to the layer 42 for calculating the layer thickness. Other sensor configurations may include a combination of ultrasound sensors and laser scanners, only one simple laser distance measurement at both measuring positions also being possible.

Although a number of aspects have been described in the context of a device, it is understood that these aspects also represent a description of the corresponding method so that a block or a component of a device shall also be construed as a corresponding method step or as a feature of a method step. Analogously, aspects that have been described in the context of, or as, a method step also represent a description of a corresponding block or detail or feature of a corresponding device.

Depending on specific implementation requirements, embodiments of the invention may also be implemented in hardware or in software. Implementation may be accomplished using a digital storage medium, for instance a floppy disk, a DVD, a Blu-ray disc, a CD, ROM, PROM, EPROM, EEPROM, or FLASH memory, a fixed disk, or some other magnetic or optical memory on which electronically readable control signals are stored that may cooperate or that cooperate with a programmable computer system such that the specific method is executed. Therefore the digital storage medium may be computer-readable. Some embodiments in accordance with the invention thus include a data carrier that has electronically readable control signals that are able to cooperate with a programmable computer system such that one of the methods described herein is executed.

In general embodiments of the present invention may be implemented as a computer program product having a program code, wherein the program code is able to execute the method when the computer program product runs on a computer. The program code may be stored for instance on a machine-readable carrier.

Other embodiments include the computer program for executing one of the methods described herein, the computer program being stored on a machine-readable carrier.

In other words, one embodiment of the inventive method is thus a computer program that has a program code for executing one of the methods described herein if the computer program is running on a computer. Another embodiment of the inventive method is thus a data carrier (or a digital storage medium or a computer-readable medium) on which is recorded the computer program for executing one of the method described herein.

Another embodiment of the inventive method is thus a data stream or a sequence of signals that represents or represent the computer program for executing one of the methods described herein. The data stream or the sequence of signals may for instance be configured such that it/they may be transferred via a data communications connection, for instance via the internet.

Another embodiment includes a processing device, for instance a computer or a programmable logic component, that is configured or adapted to execute one of the methods described herein.

Another embodiment includes a computer on which the computer program for executing one of the methods described herein is installed.

In some embodiments a programmable logic component (for instance a field-programmable gate array, a FPGA) may be used for executing some or all of the functionalities of the methods described herein. In some embodiments, a field programmable gate array may cooperate with a microprocessor to execute one of the methods described herein. In general the methods are executed in a few of the embodiments by a desired hardware device. This may be hardware that may be used universally, such as a computer processor (CPU), or it may be hardware specific to the method, for instance an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A road paver comprising:
a screed for applying a material layer to a foundation;
a layer thickness detecting device for detecting the thickness of the material layer applied; and
a signal processing unit, wherein
the layer thickness detecting device comprises a first sensor behind the screed, in the direction of travel, for detecting a first distance from the applied material layer and a second sensor in front of the screed, in the direction of travel, for detecting a second distance from the foundation;
the layer thickness detecting device is immovably attached to the screed;
the signal processing unit is configured to detect the layer thickness of the applied material layer using:
 (i) a sum of the sensor signals from the first sensor and from the second sensor,
 (ii) the distances of the first sensor and of the second sensor from the rear screed edge, and
 (iii) the attachment heights of the first sensor and of the second sensor relative to the rear screed edge, and
the data detected by the layer thickness detecting device regarding the layer thickness is used for actively controlling the road paver with respect to a position of the screed in order to maintain a pre-specified layer thickness.

2. The road paver in accordance with claim 1, wherein
the distances of the first sensor and of the second sensor from the rear screed edge are the same,
the attachment heights of the first sensor and of the second sensor relative to the rear screed edge are the same, and
the signal processing unit is configured to detect the layer thickness of the applied material layer on the basis of the sensor signals from the first sensor and from the second sensor, and of the attachment height of the first sensor and of the second sensor relative to the rear screed edge.

3. The road paver in accordance with claim 2, wherein the layer thickness of the applied material layer is determined as follows:

$$h_B = s_2 + s_1 - 2B$$

where:
$h_B$=layer thickness of the applied material layer,
$s_1$=first distance from the applied material layer detected by the first sensor,
$s_2$=second distance from the foundation detected by the second sensor, and
B=attachment height of the first sensor and of the second sensor relative to the rear screed edge.

4. The road paver in accordance with claim 1, wherein
the attachment heights of the first sensor and of the second sensor relative to the rear screed edge are the same, and
the layer thickness of the applied material layer is determined as follows:

$$h_B = s_2 + \frac{b}{a} s_1 - B\left(\frac{b}{a} + 1\right)$$

where:
$h_B$=layer thickness of the applied material layer,
$s_1$=first distance from the applied material layer detected by the first sensor,
$s_2$=second distance from the foundation detected by the second sensor,
B=attachment height of the first sensor and of the second sensor relative to the rear screed edge,
a=distance of the first sensor from the rear screed edge, and
b=distance of the second sensor from the rear screed edge.

5. The road paver in accordance with claim 1, wherein
the attachment heights of the first sensor and of the second sensor relative to the rear screed edge are the same, and
the layer thickness of the applied material layer is determined as follows:

$$h_B = s_2 - c_2 \cdot \sin\left[\alpha_2 + \left(\alpha_1 - \arcsin\frac{s_1}{c_1}\right)\right]$$

-continued where:

$$c_1 = \sqrt{a^2 + B^2}$$
$$c_2 = \sqrt{b^2 + B^2}$$
$$\alpha_1 = \arcsin\frac{B}{\sqrt{a^2 + B^2}}$$
$$\alpha_2 = \arcsin\frac{B}{\sqrt{b^2 + B^2}}$$

$h_B$=layer thickness of the applied material layer,
$s_1$=first distance from the applied material layer detected by the first sensor,
$s_2$=second distance from the foundation detected by the second sensor,
B=attachment height of the first sensor and of the second sensor relative to the rear screed edge,
a=distance of the first sensor from the rear screed edge, and
b=distance of the second sensor from the rear screed edge.

6. The road paver in accordance with claim 1, wherein the attachment height of the first sensor and of the second sensor relative to the rear screed edge is equal to the thickness of the screed.

7. The road paver in accordance with claim 1, wherein the attachment heights of the first sensor and of the second sensor relative to the rear screed edge are the same, and the signal processing unit is configured to perform a calibration for determining the attachment height, wherein during the calibration the first sensor detects the distance from the foundation.

8. The road paver in accordance with claim 7, wherein the signal processing unit is configured to determine the attachment height of the first sensor and of the second sensor relative to the rear screed edge as follows:

$$B = \frac{s_2 + s_1}{2}$$

where:
$s_1$=first distance from the foundation detected by the first sensor,
$s_2$=second distance from the foundation detected by the second sensor,
B=attachment height of the first sensor and of the second sensor relative to the rear screed edge.

9. The road paver in accordance with claim 1, wherein the layer thickness detecting device comprises at least one support that is attached to the screed,
wherein the first sensor is arranged on the support at a first distance from the rear screed edge, and
wherein the second sensor is arranged on the support at a second distance from the rear screed edge.

10. The road paver in accordance with claim 9, wherein the support comprises a measuring bar that is attached to the screed,
wherein the first sensor is arranged at a first end of the measuring bar at the first distance from the rear screed edge, and
wherein the second sensor is arranged at a second end of the measuring bar at the second distance from the rear screed edge.

11. The road paver in accordance with claim 10, wherein the measuring bar is rigid and is immovably attached to a top side of the screed.

12. The road paver in accordance with claim 9, wherein the support comprises a first rigid support that is immovably attached to the screed and on which the first sensor is arranged at the first distance from rear screed edge, and a second rigid support that is immovably attached to the screed and on which the second sensor is arranged at the second distance from the rear screed edge.

13. The road paver in accordance with claim 1, wherein the first sensor and the second sensor comprise ultrasound sensors, laser sensors, or microwave sensors, or a combination thereof.

14. A method for detecting the thickness of a material layer applied to a foundation by using a road paver by means of a thickness detecting device immovably attached to a screed of the road paver and comprising a first sensor behind the screed, in the direction of travel, for detecting a first distance from the applied material layer and a second sensor in front of the screed, in the direction of travel, for detecting a second distance from the foundation, the method comprising:
detecting a first distance from the applied material layer;
detecting a second distance from the foundation; and
determining the layer thickness of the material layer applied; wherein
the layer thickness is determined using:
(i) a sum of the detected first and second distances,
(ii) the distances of the first sensor and of the second sensor from the rear screed edge, and
(iii) the attachment heights of the first sensor and of the second sensor relative to the rear edge of the screed of the road paver, and
a position of the screed is controlled in response to the determined layer thickness in order to maintain a pre-specified layer thickness.

15. A road paver comprising:
a screed for applying a material layer to a foundation;
a layer thickness detecting device for detecting the thickness of the material layer applied; and
a signal processing unit wherein
the layer thickness detecting device comprises a first sensor behind the screed, in the direction of travel, for detecting a first distance from the applied material layer and a second sensor in front of the screed, in the direction of travel, for detecting a second distance from the foundation,
the layer thickness detecting device comprises a rigid first support that is attached to the screed and a second support that is attached to a tow arm, which rotates the screed,
the first sensor is attached to the first support and the second sensor is attached to the second support, and
the signal processing unit is configured to detect the layer thickness of the applied material layer using:
(i) a sum of the sensor signals from the first sensor and from the second sensor,
(ii) the distances of the first sensor and of the second sensor from the rear screed edge, and
(iii) the attachment heights of the first sensor and the second sensor relative to the rear screed edge.

16. The road paver in accordance with claim 15, wherein the distances of the first sensor and of the second sensor from the rear screed edge are the same,
the attachment heights of the first sensor and of the second sensor relative to the rear screed edge are the same, and the signal processing unit is configured to detect the layer thickness of the applied material layer on the basis of the sensor signals from the first sensor and from the second sensor, and of the attachment height of the first sensor and of the second sensor relative to the rear screed edge.

17. The road paver in accordance with claim 16, wherein the layer thickness of the applied material layer is determined as follows:

$$h_B = s_2 + s_1 - 2B$$

where:
$h_B$=layer thickness of the applied material layer,
$s_1$=first distance from the applied material layer detected by the first sensor,
$s_2$=second distance from the foundation detected by the second sensor, and
B=attachment height of the first sensor and of the second sensor relative to the rear screed edge.

18. The road paver in accordance with claim 15, wherein the attachment heights of the first sensor and of the second sensor relative to the rear screed edge are the same, and the layer thickness of the applied material layer is determined as follows:

$$h_B = s_2 + \frac{b}{a}s_1 - B\left(\frac{b}{a} + 1\right)$$

where:
$h_B$=layer thickness of the applied material layer,
$s_1$=first distance from the applied material layer detected by the first sensor,
$s_2$=second distance from the foundation detected by the second sensor,
B=attachment height of the first sensor and of the second sensor relative to the rear screed edge,
a=distance of the first sensor from the rear screed edge, and
b=distance of the second sensor from the rear screed edge.

19. The road paver in accordance with claim 15, wherein the attachment heights of the first sensor and of the second sensor relative to the rear screed edge are the same, and the layer thickness of the applied material layer is determined as follows:

$$h_B = s_2 - c_2 \cdot \sin\left[\alpha_2 + \left(\alpha_1 - \arcsin\frac{s_1}{c_1}\right)\right]$$

where:
$c_1 = \sqrt{a^2 + B^2}$
$c_2 = \sqrt{b^2 + B^2}$
$\alpha_1 = \arcsin\frac{B}{\sqrt{a^2 + B^2}}$
$\alpha_2 = \arcsin\frac{B}{\sqrt{b^2 + B^2}}$ $h_B$=layer thickness of the applied material layer,
$s_1$=first distance from the applied material layer detected by the first sensor,
$s_2$=second distance from the foundation detected by the second sensor,
B=attachment height of the first sensor and of the second sensor relative to the rear screed edge,
a=distance of the first sensor from the rear screed edge, and
b=distance of the second sensor from the rear screed edge.

20. The road paver in accordance with claim 15, wherein the attachment height of the first sensor and of the second sensor relative to the rear screed edge is equal to the thickness of the screed.

21. The road paver in accordance with claim 15, wherein the attachment heights of the first sensor and of the second sensor relative to the rear screed edge are the same, and the signal processing unit is configured to perform a calibration for determining the attachment height, wherein during the calibration the first sensor detects the distance from the foundation.

22. The road paver in accordance with claim 21, wherein the signal processing unit is configured to determine the attachment height of the first sensor and of the second sensor relative to the rear screed edge as follows:

$$B = \frac{s_2 + s_1}{2}$$

where:
$s_1$=first distance from the foundation detected by the first sensor,
$s_2$=second distance from the foundation detected by the second sensor,
B=attachment height of the first sensor and of the second sensor relative to the rear screed edge.

23. The road paver in accordance with claim 15, wherein the first sensor and the second sensor comprise ultrasound sensors, laser sensors, or microwave sensors, or a combination thereof.

24. A method for detecting the thickness of a material layer applied to a foundation by using a road paver by means of a thickness detecting device comprising a rigid first support that is attached to the screed, a second support attached to a tow arm, which rotates the screed, a first sensor, which is attached to the first support, for detecting a first distance from the material layer applied, and a second sensor, which is attached to the second support, for detecting a second distance from the foundation, the method comprising:
detecting a first distance from the applied material layer;
detecting a second distance from the foundation; and
determining the layer thickness of the material layer applied; wherein
the layer thickness is determined using:
(i) a sum of the detected first and second distances,
(ii) the distances of the first sensor and of the second sensor, and
(iii) the attachment heights of the first sensor and of the second sensor relative to the rear edge of the screed of the road paver.

25. The road paver in accordance with claim 15, wherein a position of the screed is controlled in response to the determined layer thickness in order to maintain a pre-specified layer thickness.

26. The method in accordance with claim 24, wherein a position of the screed is controlled in response to the determined layer thickness in order to maintain a pre-specified layer thickness.

* * * * *